United States Patent [19]
Herbert

[11] Patent Number: 5,684,705
[45] Date of Patent: Nov. 4, 1997

[54] MAILING SYSTEM

[75] Inventor: Raymond John Herbert, Leigh-on-Sea, United Kingdom

[73] Assignee: Neopost Limited, Essex, United Kingdom

[21] Appl. No.: 513,743

[22] Filed: Aug. 10, 1995

[30] Foreign Application Priority Data

Aug. 12, 1994 [GB] United Kingdom .................. 9416349

[51] Int. Cl.$^6$ .................................................. G07B 17/00
[52] U.S. Cl. ................... 364/464.11; 364/400; 364/464.2; 395/228
[58] Field of Search ...................... 364/400, 401 R, 364/402, 403, 464.02, 464.11, 464.2; 395/228

[56] References Cited

U.S. PATENT DOCUMENTS

| | | | |
|---|---|---|---|
| 4,271,352 | 6/1981 | Thomas | 235/375 |
| 4,918,425 | 4/1990 | Greenberg et al. | 340/539 |
| 5,025,141 | 6/1991 | Bolan | 235/472 |
| 5,030,807 | 7/1991 | Landt et al. | 235/375 |
| 5,091,771 | 2/1992 | Bolan et al. | 357/74 |
| 5,113,344 | 5/1992 | Kellogg et al. | 364/424.04 |
| 5,151,684 | 9/1992 | Johnsen | 340/572 |
| 5,153,583 | 10/1992 | Murdoch | 340/825.54 |
| 5,469,363 | 11/1995 | Saliga | 364/478.13 |
| 5,517,194 | 5/1996 | Carroll et al. | 340/825.54 X |
| 5,521,602 | 5/1996 | Carroll et al. | 340/825.54 X |
| 5,528,232 | 6/1996 | Verma et al. | 340/825.54 |

FOREIGN PATENT DOCUMENTS

| | | |
|---|---|---|
| 0323859 | 7/1989 | European Pat. Off. . |
| 0597457 | 5/1994 | European Pat. Off. . |
| 93/19993 | 10/1993 | WIPO . |

OTHER PUBLICATIONS

"Miniture, Coin–Shaped Chip is Read or Written with a Touch"; Dallas Semiconductor; News Release Jul. 1991.

Primary Examiner—Edward R. Cosimano
Attorney, Agent, or Firm—Shoemaker and Mattare, Ltd.

[57] ABSTRACT

A mailing system is disclosed in which a mail item includes or carries a smart device. The smart device stores data relating to postal information and destination address. A mailing machine similar to a franking machine is used by a user to enter data in the smart device and to account for postage charge used. The postal authority uses the data recorded in the smart device to handle the mail item from a mail receiving station to its destination address and to track passage of the item to its destination address.

11 Claims, 2 Drawing Sheets

MAILING SYSTEM

BACKGROUND OF THE INVENTION

This invention relates to a mailing system for conveying items from a sender to a recipient and in particular to the provision of means on the items to enable automatic handling of the items.

Generally when items are sent by mail, mailing information is applied to the exterior of the item. Such mailing information usually comprises a destination address and a postage stamp or a franking impression to indicate that a postage charge for the item has been paid and/or accounted for. In order to handle the mail and to check that the correct postage charge has been paid or accounted for, the postal authority or other carrier has to visually read the mailing information. The mail item needs to be correctly orientated to enable reading of the mailing information.

For special classes of mail, for example registered mail and recorded delivery mail, it is known to apply a bar code, identifying a specific mail item, to the item to enable tracking of the item to be effected during its carriage from the receiving office of the postal authority to the destination address.

SUMMARIES OF THE INVENTION

According to one aspect of the invention a mailing system for handling mail items wherein the mail item includes a smart device comprising at least a processor, a memory and interface means, includes a dispatch station; a first postal authority station for receiving the mail item from said dispatch station; a second postal authority station for receiving said mail item from said first postal authority station and for dispatching said mail item to a destination address; first means at said dispatch station for communicating with said interface means and for entering destination data and postal data into said smart device via said interface means; said processor being operative in response to the entered data to write said data to said memory; second means at said first station for communicating with said smart device via said interface means and for reading said destination data and postal data from said smart device; processing means responsive to said postal data read from said smart device by the second means to check that the postal data indicates that a postage charge in respect of the item has been accounted for; and third means at said second station for communicating with said smart device via said interface means to read postal data from the memory of said smart device and to transmit data to said processing means to provide an indication of receipt of said mail item at said second station.

According to a second aspect of the invention a mail item comprises a container for carrying an item therein and an electronic circuit including a processor and memory and interface means for communication between the processor and an external circuit; said electronic circuit being secured to or embedded in a wall of said container.

According to another aspect of the invention a mailing machine for handling a mail item comprising a container for carrying an item therein and an electronic circuit including a first processor and first memory and interface means for communication between the processor and an external circuit, said electronic circuit being secured to or embedded in a wall of said container including a second processor, a second memory and read/write means operable to communicate with said interface means to read information from said first processor and to writer information to said first processor, said second processor being operable to control said read/write means to write postage information via said interface means to said first processor for storing in said first memory.

BRIEF DESCRIPTION OF THE DRAWING

An embodiment of the invention will now be described by way of example with reference to the drawings in which.

DESCRIPTION OF THE PREFERRED EMBODIMENT

Figure 1:
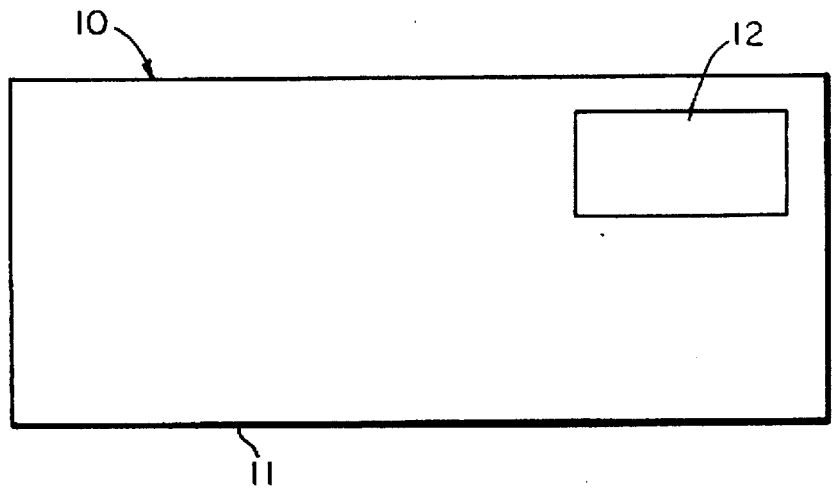
FIG. 1 shows a mail item provided with a smart chip.
Figure 3:
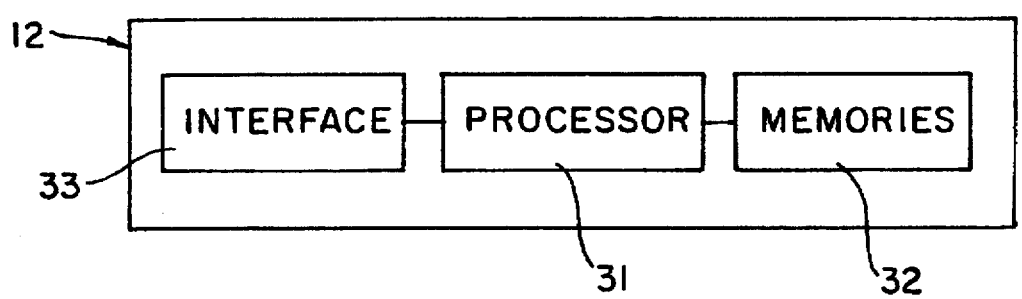
FIG. 3 is a block circuit diagram of the smart chip.

Referring first to FIG. 1, a mail item 10 comprises a re-usable envelope 11 carrying an electronic circuit consisting of an integrated circuit 12. The integrated circuit 12 is a so-called smart device including an electronic data processing circuit 31 (see FIG. 3) and memories 32 for storing data. The integrated circuit may be embedded within the material of which the envelope is formed or may be secured to the surface of the material either within the envelope or on the exterior surface thereof. The smart device includes an interface circuit 33 to enable communication between the smart device and external apparatus. If the smart device is secured to the exterior of the envelope, the interface circuit of the smart device may be of a type having contacts for making electrical connection with apparatus for writing data to or reading data from the smart device. On the other hand if the smart device is embedded in the material of which the envelope is formed or is located on an interior surface of the envelope, the interface circuit of the smart device would be of the contactless type in which electrical signals are conveyed to and from the smart device by means of capacitative or inductive links. It is preferred to use a smart device having an interface circuit of the contactless type because there would then be no requirement, as there is with smart devices having electrical contacts, of ensuring correct orientation of the mail item relative to external apparatus to enable writing or reading data to and from the smart device. Also the smart device would not need to be located at a precise location on the envelope and the envelope could be of different shapes and sizes.

It is to be understood that, instead of an envelope, the mail item 10 may be formed as a carton or other container and may be formed as a general purpose container or formed to contain a specific article or articles.

The mail item may be manufactured to include the smart device or the smart device may be provided in a packing with an adhesive layer for attachment to any desired container or envelope.

The smart device may carry in the memory 32 thereof, postal data relating to payment of a postage charge in respect of conveyance of the item to a destination address. The postal data may relate to a prepayment system or a postpayment system for payment of the postage charge. In either system, the smart device stores an accounting record of postage charge and any other required accounting data in respect of conveying the item from a sender to a recipient one or more times. For example the accounting record may relate to sending of the item to a recipient and the return of the item by the recipient to the original sender.

Whereas in conventional mailing, the destination address is applied in visually human readable form to the exterior of a mail item, in the mail item of the present invention, the destination address may be stored in the memory 32 of the smart device and in addition routing information may be stored to enable automatic sorting and routing of the item by the postal authority or other carrier. The information stored in the memory of the smart device may include identity of a user, usually the sender, to be charged for conveyance of the item by the carrier. The information relating to the user may include the address of the user and a user number.

The information may be stored in the memory of the smart device and communication with the smart device may be effected in a secure manner. Messages to and from the device may be encrypted and the information may be stored in encrypted form. By use of encryption of the information, accounting data relating to postage charges for the mail item may be held secure from any attempts to tamper with the accounting data.

Figure 2:
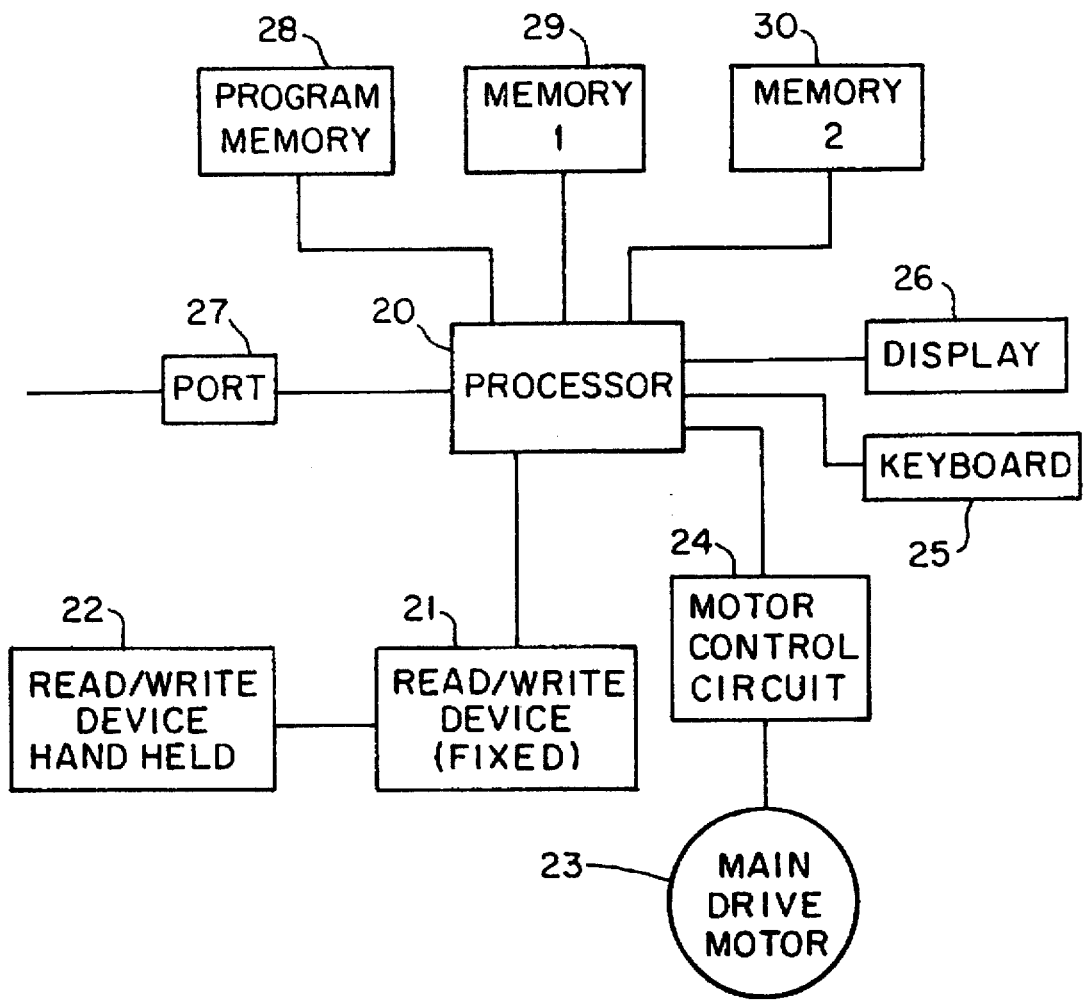
FIG. 2 is a block circuit diagram of a mailing machine in accordance with the invention.

A user of mail items as described hereinbefore would use a mailing machine to write information to the smart device of a mail item to be sent. In many respects such a mailing machine is similar to but more simple than a conventional franking machine. Referring to the block diagram of FIG. 2, the mailing machine includes a central processor 20 to perform accounting, communication and control functions of the machine. The mailing machine also includes a read/write head 21 for linking with the smart device of a mail item to enable reading and writing of data from and to the smart device. The head 21 is located in the mailing machine such that the smart device on mail items fed through the machine pass in proximity to the head when in transit through the machine whereby there is coupling between the head and the smart device to enable reading and writing of data from and to the smart device by the head. The head 21 may be a fixed head permanently located on the mailing machine or may be removable mounted with a flexible electrical connection to the machine to enable the head to be removed and moved into proximity to the smart device of an item which is not fed through the machine. Alternatively a movable hand held head 22 may be provided in addition to the fixed head 21. The heads 21, 22 may interface with the smart devices either in a contact or contactless manner in dependence upon the type of smart device used. Of course mail items may be provided with contact or contactless smart devices and hence if desired the mailing machine may be provided with heads capable of interfacing in both manners with the smart devices whereby both types of mail item may be handled.

Transport of mail items through the mailing machine is effected by feeding means driven by a motor 23 controlled by a motor control circuit 24 operated and controlled by the processor 20. In the event that failure of a smart device is detected, for example due to an incorrect response or absence of a response to interrogation of the processor 20 via the head 21, or head 22, the processor terminates operation of the feeding means and the mail item is rejected.

As is known in franking machines, a keyboard 25 and a display 26, connected to the processor, are provided for operator control of the machine. In addition, a port 27 may be provided for remote communication with the mailing machine for the purpose of remote control of the operation or functioning of the machine. A read only program memory 28 stores program routines for controlling operation of the processor 20 and non-volatile memories 29, 30 are provided for storing accounting data in the machine. Generally those parts of the mailing machine handling critical accounting data are housed in a sealed secure housing. However in the present system, accounting for postage charges may be accomplished at the receiving office of the postal authority when received mail items are passed through a reader to read data from the smart device. If accounting is carried out by the postal authority, there may be no requirement for security in the mailing machine and hence the sealed secure housing is not required.

Security for the information handled by the mailing machine and the smart devices may be provided by use of suitable encryption algorithms to encrypt the information.

The mailing machine may be constructed as a hand held portable unit which is swiped across the smart device of a mail item such as to enable communication between the hand held unit and the smart device.

When the mailing machine is to be used with a prepayment postage charge system, the memories 29, 30 store a value of credit available to be used in applying postage charges to mail items. Credit transfer to the mailing machine may be effected by known methods of resetting credit in franking machines and for example may be effected by a remote resetting computer connected to the port 27. Alternatively a smart device arranged specifically for credit resetting may be located in communication with the read/write head 21 or 22 and credit funds may be transferred from the smart device to the memories 29, 30 of the mailing machine.

The smart device may be utilised by the sender to store a message for transmission to the recipient of the mail item. The message may be maintained secure by encryption of the message by the sender. The message may be read by the recipient from the smart device and, after decryption of the message, the message may be printed out by a printer coupled to the mailing machine reader. Encryption of the message may use a key determined by the sender or recipient and known to both parties.

Figure 4:
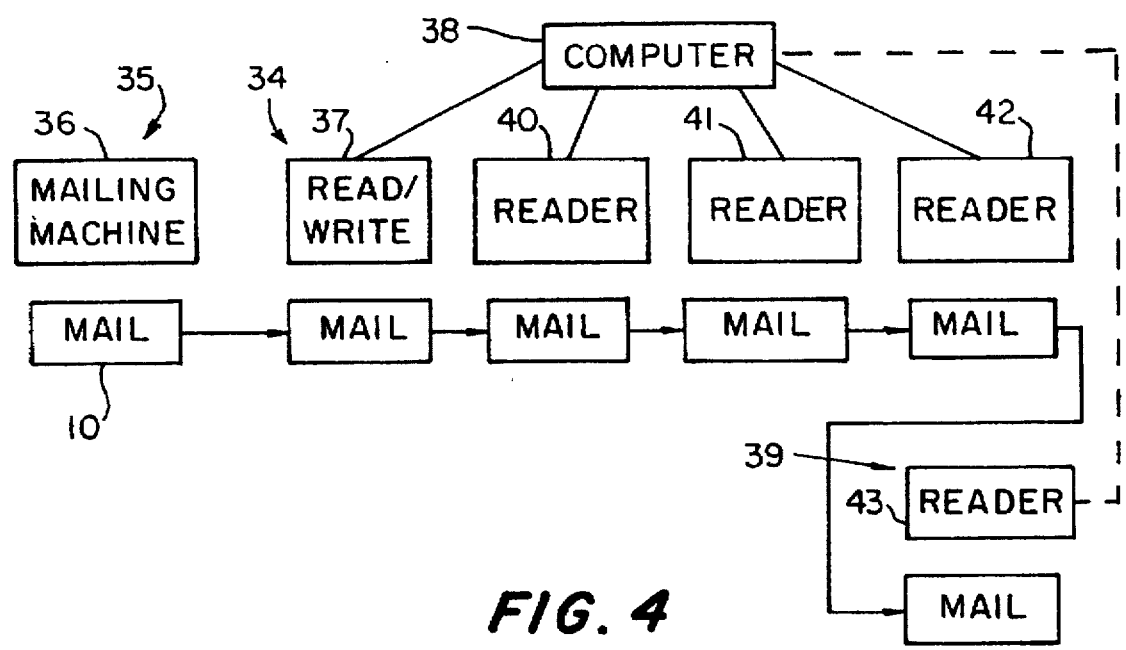
FIG. 4 illustrates a mailing system for handling the mail items.

It will be appreciated that by the provision of a smart device which records information relating to destination and routing of the item and postage charge for conveying of the item, the item can be handled with a high degree of automation. When received by a postal authority at a mail reception station 34 (see FIG. 4) from a dispatch station 35, information recorded in the smart device by a mailing machine 36 is read out by a reader 37 linked to a mail handling computer 38. The computer would thus be enabled to verify that a postage charge for the mail item has been accounted for and to route the item with a preferred routing towards the destination address 39 for that item. During subsequent handling and sorting of the item by the postal authority, readers 40, 41, 42 at other locations and also linked to the computer 38 read information from the smart device which is input to the computer 38 to enable the computer to track passage of the item to its destination address 39. That is to say, postal data stored in the memory of the smart device includes routing information and the computer is operative in response to the routing information to select a route for passage of the mail item a first station to a second station. If desired a portable read/write unit 43 may be used by a postman, at the time of delivering the item to the recipient, to log delivery of the item. On return to the delivery office of the postal authority, the portable read/write unit is linked to the computer to transmit the log of deliveries to the computer. It is envisaged that the portable read/write unit would be used in relation to special delivery items, for example recorded delivery and registered mail items. When the delivery is in respect of an order placed with a supplier by a customer, the customer may be provided with a number, or other order identification, at the time of placing the order or when the order is acknowledged. Upon delivery of the item to a recipient the order identification is entered into the portable read/write unit for verification that the delivery of the item has been made to the correct recipient.

The data processing and data storage facilities provided by the smart device may be used to handle relatively large volumes of data and, for example, the smart device may be used to store data relating to accounting, postal class, weight, senders and recipients addresses, the contents of the item e.g. value and class of goods. The data relating to contents of the item would be of use where customs checks of contents of items in transit to or from foreign countries are carried out. Furthermore, during handling of the item in the postal system, times and dates at which the item passes through predetermined points, for example sorting offices, may be entered into the smart device by equipment handling the items and a routing for the item through the postal system may be entered and stored. The smart device may store one or more algorithms for use in calculation of data, e.g. calculation of postal charge from the weight of the item.

It will be appreciated that the provision of the smart device on the mail item has the potential for storing a relatively large amount of data on each mail item as compared with conventional mail items. Conventional mail items bear a destination address written or typed in human readable characters which is not reliably capable of being read by machine. By providing the destination address in the smart device, the destination address is readable by machine and the handling and sorting of the mail item in the postal system in accordance with destination address of the mail item may be entirely automated.

If the smart device is of the contactless type there is no requirement for orientating the mail item in any specified orientation because writing and reading data to and from the smart device can be accomplished with the smart device merely located adjacent a writing and reading device without being in a specified orientation relative to the writing and reading device. Also although it may be convenient to locate the smart device in a predetermined location relative to edges of a mail item, it is not essential to locate the contactless smart device at a predetermined location on the item and the smart device may be affixed to the mail item in any orientation.

The use of a smart device on mail items enables increased security, for example, in respect of postal charge accounting data in relation to mail items. Sensitive data may be stored in the smart device in encrypted form and the data processing facilities of the smart device may be used to decrypt the data smart device when an appropriate decryption key or algorithm is input to the smart device. Also the smart device may store data relating to the identity of the mailing machine used to write data to the smart device. Use of a smart device permits calculations to take place on the mail item e.g. for calculating postal charge from weight information. Information may be stored in the smart device to provide a unique identity to each item whereby tracking of items in the postal system may be accomplished.

The smart device may be embedded in a wall of a container or secured to the container in the course of manufacturing the container. Alternatively the smart device may be provided as an element to be secured to any desired container by a user. In the latter arrangement, the smart device would be provided in a protective enclosure with an adhesive layer to enable the smart device to be affixed to a container. It will be appreciated that the container may comprise an envelope which may be plain or, when the contents thereof require additional protection the container may be a padded envelope. Alternatively the container may be a carton or box. If the container is of such a size that it cannot or is inconvenient to be handled by the mailing machine, the smart device may be provided in or on a support, for example in the form of a label or the like, which can be handled conveniently by the mailing machine and then, after information has been written to the smart device by the mailing machine, the support with the smart device in or on the support is affixed to the container.

It is to be understood that while reference has been made hereinbefore to mail items and postal authorities the invention is may be utilised in handling other items required to be transported from a dispatch station to a destination by a carrier.

I claim:

1. A mailing system for handling mail items wherein the mail item includes a smart device comprising at least a processor, a memory and interface means, the system including a dispatch station; a first postal authority station for receiving the mail item from said dispatch station; a second postal authority station for receiving said mail item from said first postal authority station and for dispatching said mail item to a destination address; first means at said dispatch station for communicating with said interface means and for entering destination data and postal data into said smart device via said interface means; said processor being operative in response to the entered data to write said data to said memory; second means at said first station for communicating with said smart device via said interface means and for reading said destination data and postal data from said smart device; processing means responsive to said postal data read from said smart device by the second means to check that the postal data indicates that a postage charge in respect of the item has been accounted for; and third means at said second station for communicating with said smart device via said interface means to read postal data from the memory of said smart device and to transmit data to said processing means to provide an indication of receipt of said mail item at said second station.

2. A mailing system as claimed in claim 1 wherein said postal data stored in said memory of said smart device includes routing information and wherein the processing means is operative in response to said routing information to select a route for passage of said mail item from said first station to said second station.

3. A mailing system as claimed in claim 1 including means operable at the destination address for the mail item to read data from the memory and to transmit said data to the processing means whereby correct delivery of the mail item to the destination address is checked.

4. A mail item comprising a container for carrying contents therein and an electronic circuit including a processor and memory and interface means for communication between the processor and an external circuit; said electronic circuit being secured to or embedded in a wall of said container.

5. A mail item as claimed in claim 4 wherein the electronic circuit comprises a smart device chip.

6. A mail item as claimed in claim 4 wherein the interface means provides contactless communication.

7. A mail item as claimed in claim 4 wherein the interface means includes electrical contacts located on an exterior surface of the wall of the container.

8. A mail item as claimed in claim 4 wherein the container comprises an envelope.

9. A mail item as claimed in claim 4 wherein the electronic circuit is operable to store data relating to any of postage charge, destination address, postal handling information, identity of the mail item and identity of a machine used for writing data to the electronic circuit.

10. A mailing machine for handling a mail item comprising a container carrying contents therein and an electronic circuit including a first processor and first memory and interface means for communication between the processor and an external circuit, said electronic circuit being secured to or embedded in a wall of said container, the mailing machine including a second processor, a second memory and read/write means operable to communicate with said interface means to read information from said first processor and to write information to said first processor, said second processor being operable to control said read/write means to write postage information via said interface means to said first processor for storing in said first memory.

11. A mailing machine as claimed in claim 10 wherein the second processor is operable to control the read/write means to write postage information relating to any of postage charge, destination address, postal handling information and identity of the mail item via the interface means to the first processor for storage in the first memory.

* * * * *